US005875028A

United States Patent [19]

Lasken et al.

[11] Patent Number: 5,875,028

[45] Date of Patent: Feb. 23, 1999

[54] WORKSTATION FOR BOTH MANUALLY AND AUTOMATICALLY CONTROLLING THE OPERATION OF A PRINTING PRESS

[75] Inventors: Richard D. Lasken, Naperville; Xin Xin Wang, Woodridge; Robert Nemeth, Darien, all of Ill.

[73] Assignee: Goss Graphic Systems, Inc., Westmont, Ill.

[21] Appl. No.: 928,253

[22] Filed: Sep. 12, 1997

Related U.S. Application Data

[63] Continuation of Ser. No. 536,234, Sep. 28, 1995, Pat. No. 5,805,280.

[51] Int. Cl.[6] .......... G01N 21/01; B41F 27/00

[52] U.S. Cl. .......... 356/244; 101/474; 101/389.1; 269/21

[58] Field of Search .......... 356/244, 379, 356/445–447; 101/389.1, 382.1, 383, 407.1, 474, 477, DIG. 45; 269/21

[56] References Cited

U.S. PATENT DOCUMENTS

| | | | |
|---|---|---|---|
| 2,968,988 | 1/1961 | Crosfield | 88/14 |
| 3,612,753 | 10/1971 | Korman | 178/5.2 A |
| 3,806,633 | 4/1974 | Coleman | 178/5.2 A |
| 3,958,509 | 5/1976 | Murray et al. | 101/426 |
| 4,257,323 | 3/1981 | Crasnianski | 101/41 |
| 4,472,736 | 9/1984 | Ushio et al. | 358/75 |
| 4,475,458 | 10/1984 | Kennell et al. | 101/389.1 |
| 4,479,435 | 10/1984 | Takeuchi et al. | 101/389.1 |
| 4,481,532 | 11/1984 | Clark et al. | 358/80 |
| 4,482,917 | 11/1984 | Gaulke et al. | 358/80 |
| 4,494,875 | 1/1985 | Schramm et al. | 356/402 |
| 4,505,589 | 3/1985 | Ott et al. | 356/402 |
| 4,539,647 | 9/1985 | Kaneko et al. | 364/526 |
| 4,561,103 | 12/1985 | Horiguchi et al. | 382/1 |
| 4,564,859 | 1/1986 | Knop et al. | 358/75 |
| 4,583,186 | 4/1986 | Davis et al. | 364/526 |
| 4,590,515 | 5/1986 | Wellendorf | 358/75 |
| 4,631,578 | 12/1986 | Sasaki et al. | 358/80 |
| 4,631,579 | 12/1986 | Hoffrichter et al. | 358/80 |
| 4,643,563 | 2/1987 | Sayanagi | 355/77 |
| 4,649,500 | 3/1987 | Yamada et al. | 364/518 |
| 4,649,502 | 3/1987 | Keller et al. | 364/519 |
| 4,666,307 | 5/1987 | Matsumoto et al. | 356/404 |
| 4,667,227 | 5/1987 | Ikeda | 358/75 |
| 4,668,090 | 5/1987 | Kipphan et al. | 356/244 |
| 4,685,139 | 8/1987 | Masuda et al. | 382/1 |
| 4,713,684 | 12/1987 | Kawamura et al. | 358/78 |
| 4,752,822 | 6/1988 | Kawamura | 358/80 |
| 4,758,885 | 7/1988 | Sasaki et al. | 358/80 |

(List continued on next page.)

FOREIGN PATENT DOCUMENTS

| | | |
|---|---|---|
| 0 142 470 b1 | 10/1984 | European Pat. Off. . |
| 0 601 259 A1 | 12/1992 | European Pat. Off. . |
| 35 33 549 | 10/1986 | Germany . |
| 40 23 320 | 1/1992 | Germany . |
| 60-115820 | 6/1985 | Japan . |
| 2-110566 | 4/1990 | Japan . |
| 649842 A5 | 6/1985 | Switzerland . |

OTHER PUBLICATIONS

Graphic Microsystems, Inc. Advertisement for Autosmart™ Software.

Graphic Microsystems, Inc., *Autosmart II 10.0 User's Manual,* pp. 1–2.

Heidelberg, *Technical Series . . . 2 Stop Guessing About Color.*

*Primary Examiner*—Hoa Q. Pham
*Attorney, Agent, or Firm*—Marshall, O'Toole, Gerstein, Murray & Borun

[57] ABSTRACT

A control system (60) for a printing press having a printed copy, a device (68 and 70) for manually using the copy to control operation of the press based on information on the copy, and device (80 and 82) for automatically reading the copy while excluding any control by target information on the copy, and controlling operation of the press based upon information on the copy.

5 Claims, 13 Drawing Sheets

U.S. PATENT DOCUMENTS

| | | | |
|---|---|---|---|
| 4,790,022 | 12/1988 | Dennis | 382/8 |
| 4,794,382 | 12/1988 | Lai et al. | 340/703 |
| 4,794,648 | 12/1988 | Ayata et al. | 382/8 |
| 4,802,107 | 1/1989 | Yamamoto et al. | 364/525 |
| 4,830,501 | 5/1989 | Terashita | 356/402 |
| 4,837,711 | 6/1989 | Suzuki | 364/523 |
| 4,839,719 | 6/1989 | Hirota et al. | 38/75 |
| 4,839,721 | 6/1989 | Abdulwahab et al. | 358/80 |
| 4,855,765 | 8/1989 | Suzuki et al. | 346/154 |
| 4,879,594 | 11/1989 | Stansfield et al. | 358/80 |
| 4,884,130 | 11/1989 | Huntsman | 358/80 |
| 4,899,214 | 2/1990 | Robbins et al. | 358/75 |
| 4,908,712 | 3/1990 | Uchiyama et al. | 358/298 |
| 4,910,593 | 3/1990 | Weil | 358/113 |
| 4,926,254 | 5/1990 | Nakatsuka et al. | 358/76 |
| 4,941,038 | 7/1990 | Walowit | 358/80 |
| 4,947,348 | 8/1990 | Van Arsdell | 364/523 |
| 4,949,284 | 8/1990 | Watanabe | 364/520 |
| 4,956,703 | 9/1990 | Uzuda et al. | 358/76 |
| 4,958,221 | 9/1990 | Tsuboi et | 359/80 |
| 4,959,790 | 9/1990 | Morgan | 364/518 |
| 4,962,421 | 10/1990 | Murai | 358/76 |
| 4,967,264 | 10/1990 | Parulski et al. | 358/44 |
| 4,967,379 | 10/1990 | Ott | 364/526 |
| 4,970,584 | 11/1990 | Sato et al. | 358/75 |
| 4,975,769 | 12/1990 | Aizu et al. | 358/80 |
| 4,975,862 | 12/1990 | Keller et al. | 364/526 |
| 4,977,448 | 12/1990 | Murata et al. | 358/75 |
| 5,003,494 | 3/1991 | Ng | 364/519 |
| 5,018,008 | 5/1991 | Asada | 358/78 |
| 5,029,107 | 7/1991 | Lee | 364/518 |
| 5,045,937 | 9/1991 | Myrick | 358/109 |
| 5,047,842 | 9/1991 | Bouman, Jr. et al. | 358/75 |
| 5,053,866 | 10/1991 | Johnson | 358/75 |
| 5,068,810 | 11/1991 | Ott | 364/526 |
| 5,081,527 | 1/1992 | Naito | 358/75 |
| 5,084,758 | 1/1992 | Danzuka et al. | 358/296 |
| 5,087,126 | 2/1992 | Pochieh | 356/402 |
| 5,089,977 | 2/1992 | Pflästerer et al. | 364/526 |
| 5,101,448 | 3/1992 | Kawachiya et al. | 382/61 |
| 5,105,466 | 4/1992 | Tsujiuchi et al. | 382/1 |
| 5,107,332 | 4/1992 | Chan | 358/80 |
| 5,120,624 | 6/1992 | Takanashi et al. | 430/47 |
| 5,121,196 | 6/1992 | Hung | 358/75 |
| 5,122,977 | 6/1992 | Pfeiffer | 364/551.01 |
| 5,126,839 | 6/1992 | Sugira | 358/80 |
| 5,128,748 | 7/1992 | Murakami et al. | 358/75 |
| 5,130,935 | 7/1992 | Takiguchi | 364/526 |
| 5,142,356 | 8/1992 | Usami et al. | 358/80 |
| 5,148,288 | 9/1992 | Hannah | 358/298 |
| 5,157,483 | 10/1992 | Shoji et al. | 358/75 |
| 5,157,506 | 10/1992 | Hannah | 358/298 |
| 5,162,899 | 11/1992 | Naka et al. | 358/80 |
| 5,163,012 | 11/1992 | Wuhrl et al. | 364/552 |
| 5,166,755 | 11/1992 | Gat | 356/419 |
| 5,166,789 | 11/1992 | Myrick | 358/109 |
| 5,170,441 | 12/1992 | Mimura et al. | 382/45 |
| 5,172,224 | 12/1992 | Collette et al. | 358/80 |
| 5,175,772 | 12/1992 | Kahn et al. | 382/1 |
| 5,181,081 | 1/1993 | Suhan | 356/394 |
| 5,181,257 | 1/1993 | Steiner et al. | 382/17 |
| 5,182,721 | 1/1993 | Kipphan et al. | 364/526 |
| 5,191,361 | 3/1993 | Abe | 346/157 |
| 5,200,817 | 4/1993 | Birnbaum | 358/80 |
| 5,206,707 | 4/1993 | Ott | 356/402 |
| 5,216,498 | 6/1993 | Matsunawa et al. | 358/75 |
| 5,224,421 | 7/1993 | Doherty | 101/211 |
| 5,283,671 | 2/1994 | Stewart et al. | 358/532 |
| 5,299,034 | 3/1994 | Kanno et al. | 358/518 |
| 5,302,833 | 4/1994 | Hamar et al. | 250/561 |
| 5,317,425 | 5/1994 | Spence et al. | 358/504 |
| 5,345,320 | 9/1994 | Hirota | 358/518 |
| 5,357,448 | 10/1994 | Stanford | 364/526 |
| 5,363,318 | 11/1994 | McCauley | 364/571.01 |
| 5,392,360 | 2/1995 | Weindelmayer et al. | 382/8 |
| 5,404,156 | 4/1995 | Yamada et al. | 347/115 |
| 5,412,577 | 5/1995 | Sainio et al. | 364/469 |
| 5,416,613 | 5/1995 | Rolleston et al. | 358/518 |
| 5,420,945 | 5/1995 | Concannon et al. | 382/312 |
| 5,424,553 | 6/1995 | Morton | 250/548 |
| 5,452,112 | 9/1995 | Wan et al. | 358/504 |
| 5,459,678 | 10/1995 | Feasey | 364/571.07 |
| 5,463,469 | 10/1995 | Funada et al. | 358/296 |
| 5,467,412 | 11/1995 | Capitant et al. | 382/167 |
| 5,483,360 | 1/1996 | Rolleston et al. | 358/518 |
| 5,488,492 | 1/1996 | Abe | 358/518 |
| 5,491,568 | 2/1996 | Wan | 358/518 |
| 5,493,518 | 2/1996 | Keating | 364/578 |
| 5,508,810 | 4/1996 | Sato | 358/296 |
| 5,509,086 | 4/1996 | Edgar et al. | 382/167 |
| 5,509,115 | 4/1996 | Butterfield et al. | 395/147 |
| 5,521,722 | 5/1996 | Colvill et al. | 358/500 |
| 5,530,656 | 6/1996 | Six | 364/526 |
| 5,543,940 | 8/1996 | Sherman | 358/518 |
| 5,604,586 | 2/1997 | Bahr et al. | 356/244 |

Camera: Single CCD
with Built in Filters

WORKSTATION FOR BOTH MANUALLY AND AUTOMATICALLY CONTROLLING THE OPERATION OF A PRINTING PRESS

This is a Continuation of U.S. application Ser. No. 08/536,234, filed Sept. 28, 1995, now U.S. Pat. No. 5,805, 280.

BACKGROUND OF THE INVENTION

The present invention relates to control systems for a printing press.

In the past, four process inks (cyan, magenta, yellow and black) have been used on a printing press to produce copies with a gamut of colors. To improve trapping and reduce ink cost, various undercolor removal techniques (UCR) and grey component replacement (GCR) techniques have been used in the color separation processing. The UCR and GCR techniques remove a certain amount of the cyan, magenta and yellow ink from some printing areas and replace them with a certain amount of the black ink. Thus, the black ink has been used to generate not only the text but also the color image, thus reducing the total volume of ink used to print. Different color separation equipment manufacturers offer different UCR and GCR techniques to determine when this black ink substitution will take place and what amount of inks will be substituted.

In the past, the press room color reproduction quality control process has been divided into two categories: "control by target" and "control by image."

In the "control by target" method, a set of color control targets is printed in a margin. Instruments, such as densitometers, are used to monitor the color attributes, such as the optical density, of these targets. The printing press is then adjusted based on the measured deviation of these control targets from a predefined attribute value. The application of this method for quality control creates waste and consumes resources in that an additional process is required to cut off this target from the final product. It also requires a tight material control for paper, ink, and other printing parameters.

In the "control by image" method, the print image on a production copy is compared with the printed image on a reference copy, called a proof. The press is then adjusted based on the difference between the production image and the reference image. This system is more versatile because it does not require an additional target to be printed. The "control by image" method is also more accurate than the "control by target" method because in some situations although the measured attributes of control targets on the production and reference images are the same, the two images will look different. Conventionally, both the image comparing task and the press adjusting task are performed by a press operator. To improve the productivity and the color consistency, several automatic printing quality inspection systems have been reported recently. These systems use opto-electronic sensor devices, such as a spectrophotometer, or CCD color cameras, to measure the color reproduction quality. Currently, the bandwidth of these sensor devices is limited to the visible region of 400 nm through 700 nm in wavelength of the electromagnetic spectrum. However, within the visible region, it is not possible for these devices to reliably distinguish the black ink from the process black made by the combination of cyan, magenta, and yellow inks, or to determine whether the black ink or all cyan, magenta, and yellow inks should be adjusted. Although these devices, such as spectrophotometers, might be able to measure the printed color accurately, it is difficult to use the measured color information to achieve the automatic control for a four-color press without a target due to the involvement of the UCR and GCR techniques. A control method without targets could require selecting the points in the image to be measured or a large number of measurements would have to be acquired. A camera system can acquire a large number of measurements simultaneously, giving it an advantage when targets are not printed.

It is desired to implement the system for both manual use of a printed copy and automatic use of the information on the copy in order to control the press.

SUMMARY OF THE INVENTION

A principal feature of the present invention is the provision of an improved control system for a printing press.

The control system of the press comprises, a printed copy, means for manually using the copy to control operation of the press based on information on the copy, and means for automatically reading the copy while excluding any control by target information on the copy, and controlling operation of the press based upon information on the copy.

Thus, a feature of the invention is the provision of a system for manual or automatic use of the printed copy in control of the press.

Another feature of the invention is that the manual and automatic devices use the same space on a table in order to carry out their control of the press.

Still another feature of the invention is the provision of a plate having a uniform surface being exposed to the reading means in a configuration of the device for use in calibrating the system.

Yet another feature of the invention is the provision of a plate having a gray scale for exposure to the reading means for use in calibrating the system.

Still another feature of the invention is that the device has a vacuum table which releasably retains the copy in the automatic mode of the system.

A further feature of the invention is that the reading means comprises at least one camera having a field of view, and in which the vacuum table selective positions the copy in the field of view or outside of the field of view.

Another feature of the invention is that the device greatly simplifies the use of a printed reference copy to produce a live or production copy.

Yet another feature of the invention is that the device is of simplified construction and reduced cost.

Further features will become more fully apparent in the following description of the embodiments of the invention, and from the appended claims.

DESCRIPTION OF THE PREFERRED EMBODIMENTS

Figure 1:
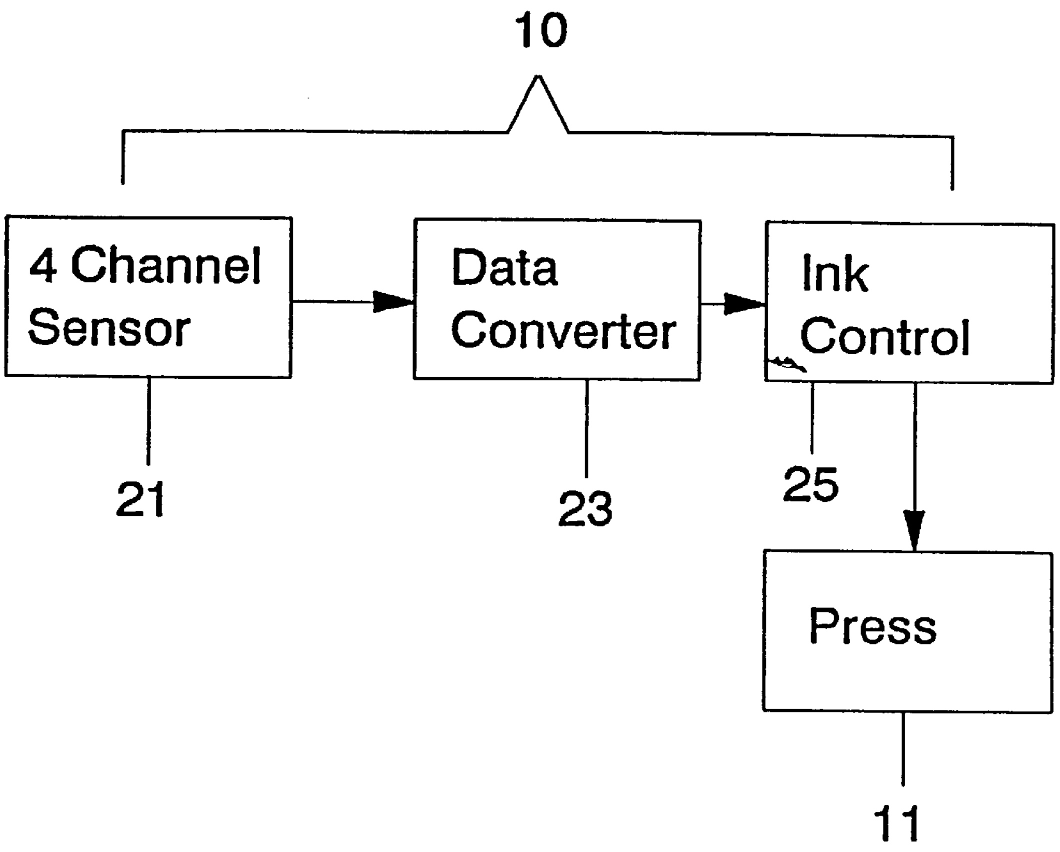
FIG. 1 is a block diagram of a control system for a printing press of the present invention.

Referring now to FIG. 1, there is shown a control system generally designated 10 for a printing press 11 of the present invention.

Figure 8:
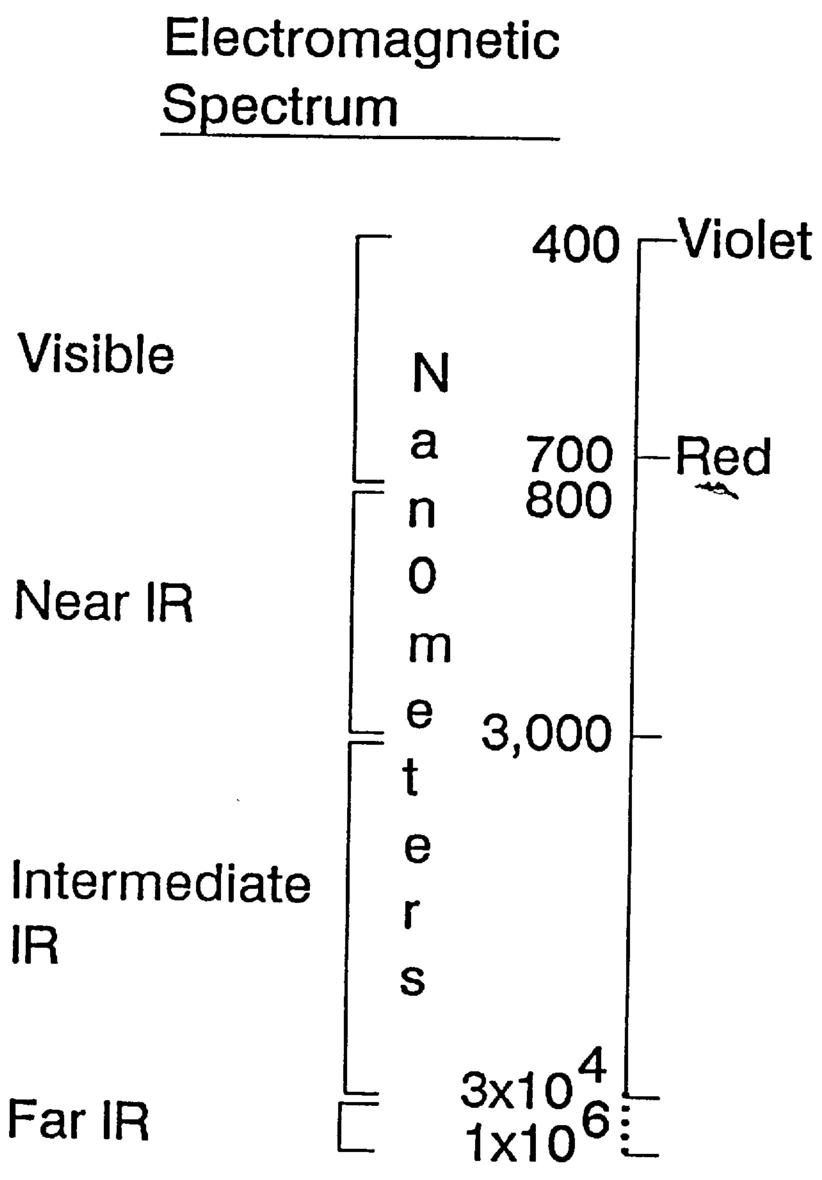
FIG. 8 is a diagrammatic view of a spectrum of electromagnetic waves including the visible spectrum and the infrared spectrum.

The control system 10 has a 4 channel sensor 21, a data converter 23 for processing information from the sensor 21, and a device 25 for controlling ink for the press 11. As will be seen below, the 4 channel sensor 21 detects the energy reflected from a paper surface, such as the paper web for the press 11, in both the visible region and the infrared region of the electromagnetic spectrum. As shown in FIG. 8, electromagnetic waves in the infrared region have a longer wave length than the visible spectrum, with the wave lengths of the electromagnetic waves in the region of visible light being approximately 400 to 700 nanometers (nm), and the wave lengths of the electromagnetic waves in the infrared region, including near infrared, being equal to or greater than 800 nm.

Figure 2:
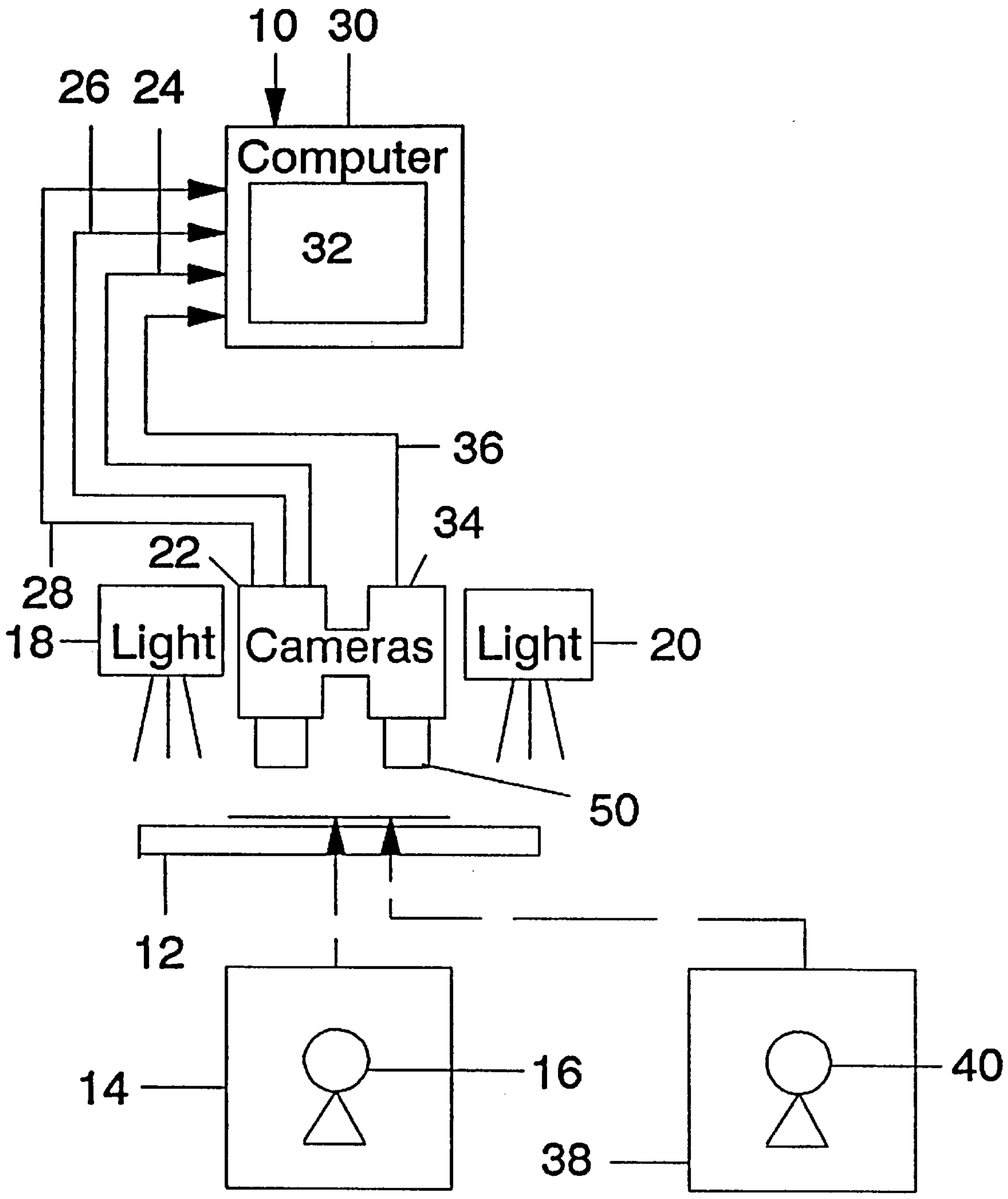
FIG. 2 is a diagrammatic view of the system of FIG. 1.

As show in FIG. 2, the control system 10 has a support 12 for placement of a sheet of paper 14 with image or indicia 16 on the sheet 14 in a configuration beneath a pair of opposed lights 18 and 20 for illuminating the sheet 14. The system 10 has a first color video camera or sensor 22 having three channels for detecting attributes of the inks from the sheet 14 in the visible region of the electromagnetic spectrum such as red, green and blue, or cyan, magenta, and yellow, and for sending the sensed information over separate lines or leads 24, 26, and 28 to a suitable digital computer 30 or Central Processing unit having a randomly addressable memory (RAM) and a read only memory (ROM), with the computer or CPU 30 having a suitable display 32. Thus, the three distinct color attributes of the inks are sensed by the camera 22 from the sheet 14, and are received in the memory of the computer 30 for storage and processing in the computer 30.

The system 10 also has a black/white second video camera or sensor 34 having a filter 50 such that it senses the attributes of the inks in the infrared region of the electromagnetic spectrum, having a wave length greater than the wave length of the electromagnetic waves in the visible region of light. The camera or sensor 34 thus senses infrared information from the sheet 14, and transmits the sensed information over a lead 36 to the computer 30, such that the information concerning the infrared rays is stored in and processed by the computer 30.

Figure 7:
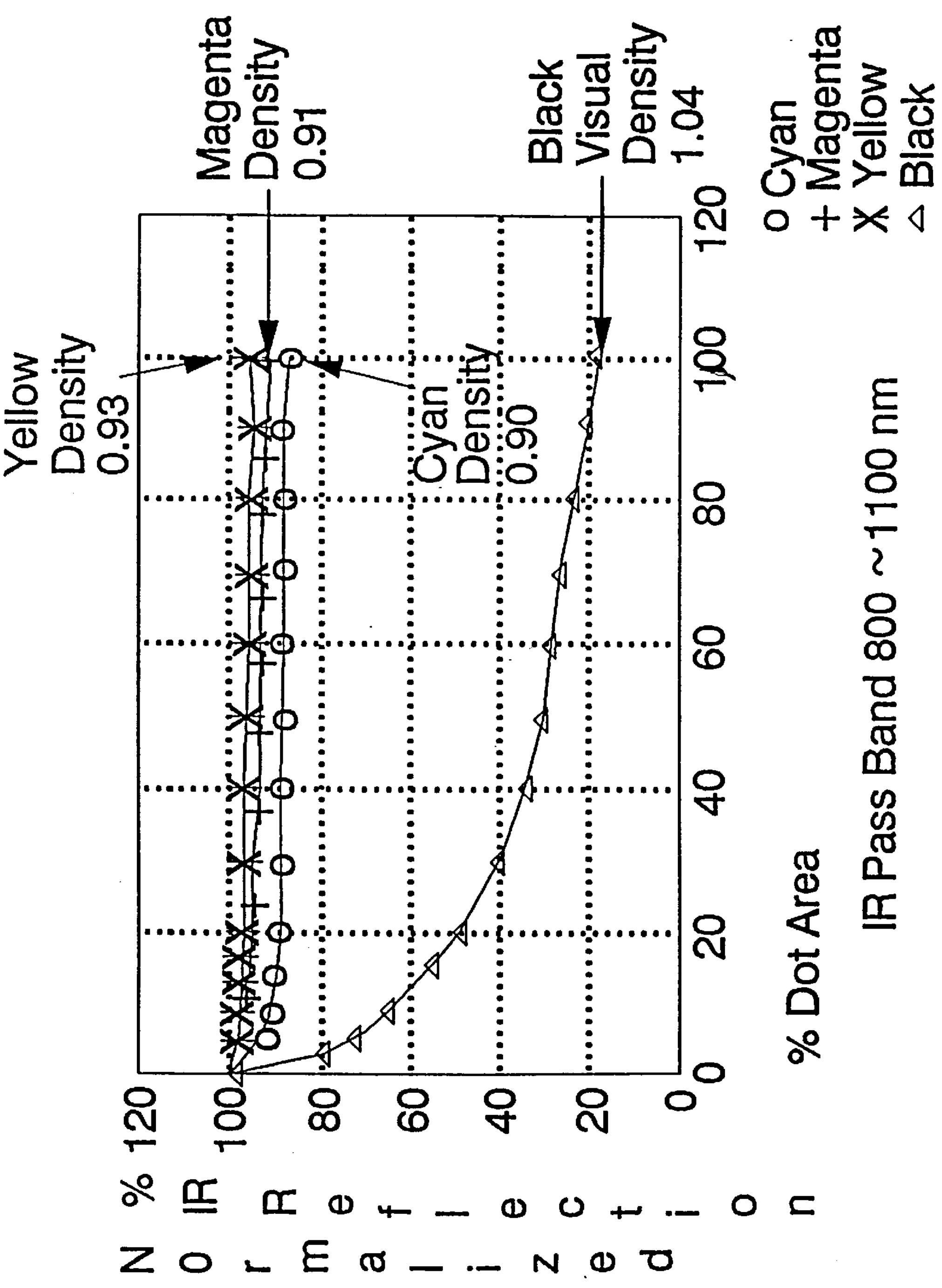
FIG. 7 is a chart plotting the normalized percentage of IR Reflection against the percentage Dot Area in a printed sheet.

The normalized percentage of infrared (IR) reflection vs. the percentage of dot area is show in the chart of FIG. 7. It will be seen that the infrared reflectance of cyan, magenta, and yellow inks show no significant change as a function of percentage of dot area. However, the normalized infrared reflectance of the black ink displays a significant change as a function of percentage of dot area, and changes from a normalized value of 100% IR reflection for 0% dot area to approximately 18% IR reflection corresponding to 100% dot area. Hence, the black ink may be easily sensed and distinguished from other color inks in the infrared region of the electromagnetic waves.

As shown in FIG. 2, the sheet 14 may contain printed image or indicia 16 which is obtained from a current press run of the press 11, termed a production or current copy. In addition, a sheet 38 containing printed image or indicia 40, termed a reference copy, from a previous reference press run may be placed on the support 12 beneath the cameras 22 and 34 in order to sense the energy reflected from the sheet 38, and send the sensed information to the memory of the computer 30 for storage and processing in the computer 30, as will be described below.

Thus, the cameras or sensors 22 and 34 may be used to sense both the current copy or sheet 14 and the reference copy or sheet 38. The information supplied by the cameras 22 and 34 is formed into digital information by a suitable analog to digital converter in a frame grabber board on the computer 30. Thus, the computer 30 operates on the digital information which is stored in its memory corresponding to the information sensed from the sheets 14 and 34 by the cameras or sensors 22 and 34.

Figure 3:
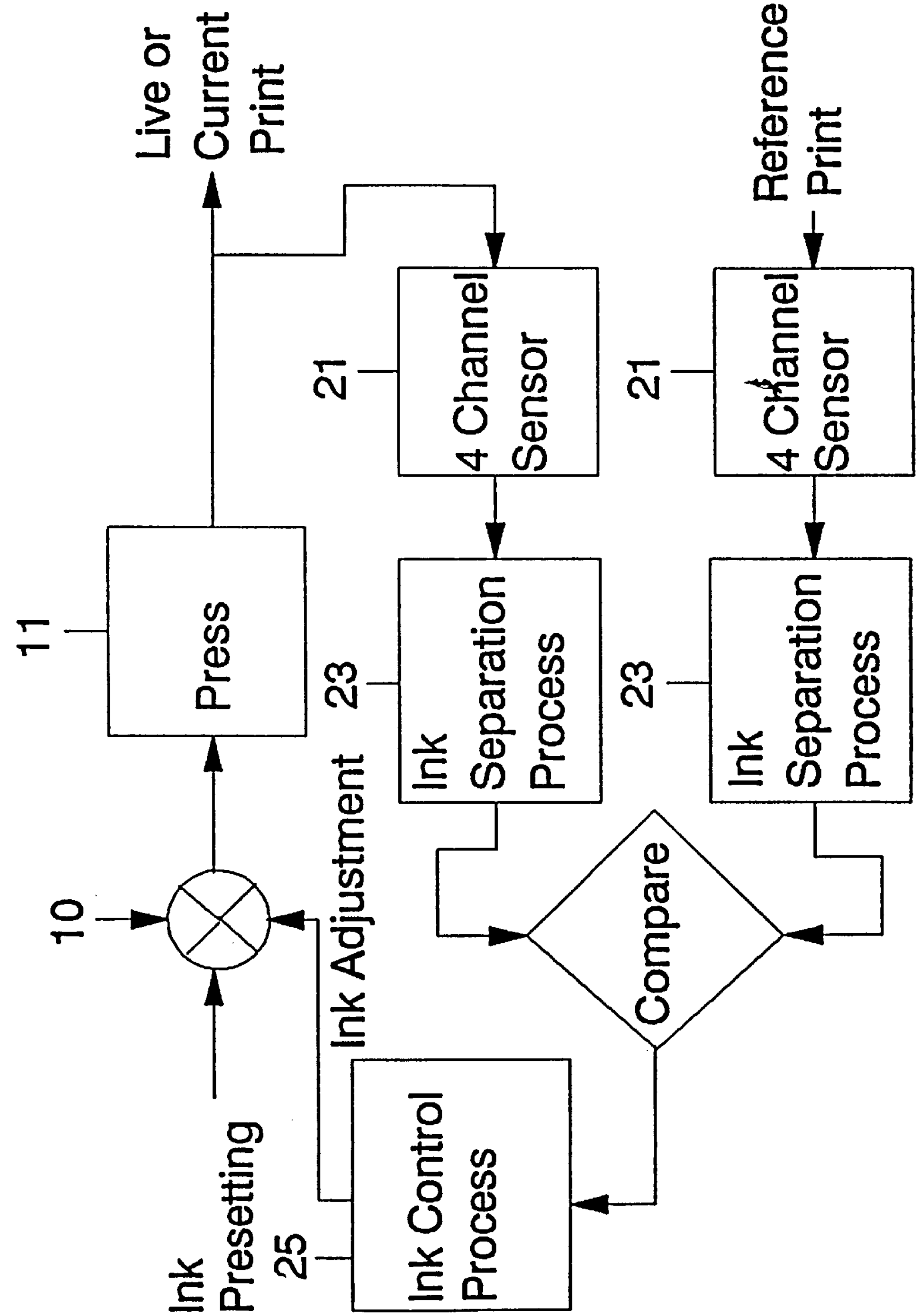
FIG. 3 a block diagram of the control system of FIG. 1.

Referring now to FIG. 3, there is shown a block diagram of the control system 10 for the printing press 11 of the present invention. As shown, the four inks (cyan, magenta, yellow, and black) of the four-color printing press 11 are first preset, after which a print is made by the press 11 with a current ink setting, thus producing a production or current printed copy, as shown. The color and black/white video cameras or sensors 22 and 34 of FIG. 2 serve as a four channel sensor 21 to capture an image of the current printed copy, and then place this information into the memory of the computer 30 after it has been formed into digital information.

Next, an "Ink Separation Process" 23 is used to convert the red, green, blue and IR images captured by the four channel sensor 21 into four separated cyan, magenta, yellow and black ink images, which represent the amount of corresponding ink presented on the live copy. The "Ink Separation Precess" 23 may utilize mathematic formulas, data look up tables or other suitable means to perform the data conversion task.

The similar processes are also applied to the reference copy. First, the four channel sensor 21 is used to capture the red, green, blue and IR images from the reference copy. Then, the "Ink Separation Process" 23 is utilized to obtain the cyan, magenta, yellow and black ink images, which represent the amount of corresponding ink presented on the reference copy.

As shown, the ink images of the production copy are compared with the ink images of the reference copy by the computer 30 to detect the variation of ink distribution for each of the cyan, magenta, yellow and black inks.

The determined differences in ink distribution are then processed by the computer 30 in order to obtain an indication for controlling the keys or other devices of the press 11 in an ink control process, and thus provide an indication of an ink adjustment to the press to obtain further copies which will have a closer match to the reference copy. The indication of ink changes may be automatically supplied to the press 11, or the operator may utilize the indications of ink color attributes to set the press 11, such as adjustments to ink input rate by using the keys.

In the past, four process inks (cyan, magenta, yellow, and black) have been used on a printing press to produce copies with a gamut of colors. In these systems, the black ink has been used to generate not only the text but also the color image. In a control by image system, the print image of a production copy is compared with the printed image on a reference copy, termed a proof, and the press is adjusted based on the difference between the production image and the reference image. However, within the visible region, it is not possible to reliably distinguish the black ink from the process black made by the combination of cyan, magenta, and yellow inks, or whether the black ink or all cyan, magenta, and yellow inks should be adjusted.

The four channel sensor 21 is utilized to sense not only attributes in three channels of the visible region, the fourth channel of the sensor 21 senses an attribute in the infrared region in order to determine the correct amount of inks, including black ink, to correctly reproduce the proof. The printing press control system uses the four channel detector or sensor 21 to detect the energy reflected from a paper surface, such as the sheets 14 and 38, or the paper web of the press 11, with three channels being in the visible region and one channel being in the infrared region of the electromagnetic spectrum. The control system 10 has a device 23 for converting the output of the sensing device 21 to a set of variables which represent the amount of ink presented on the paper for any of the cyan, magenta, yellow, and black inks, and a device 25 responsive to the converting device 23 for adjusting the four-color printing press 11 to maintain the color consistency.

In a preferred form, the bandwidth of the infrared channel may be between 800 nm and 1100 nm, which is a portion of the near infrared region, and which is compatible with a regular silicon detector, although the working wavelength of the infrared channel may be longer than 1100 nm. At least three distinct channels are utilized in the visible region which may correspond to red, green, and blue (RGB), or cyan, magenta, and yellow (CMY), or other colors. The bandwidth of each channel in the visible region may be less than 70 nm, more than 100 nm, or any value in between, with channels having a multiple peak in its passing band, such as magenta, being also included.

The sensor device 21 may be constructed from either a single element detector, a one-dimensional (linear) detector, a two-dimensional (area) detector, or other suitable detector structure, as will be seen below. The sensor device may be constructed by adding an additional infrared channel to existing devices, adding an infrared channel to a RGB color camera or a densitometer, or by extending the working band into the infrared region, e.g., adding infrared capability to a spectrophotometer. The light source 18 and 20 used provides sufficient radiated energy in both the visible region and the infrared region, depending upon the sensor working band and sensitivity.

Figure 9:
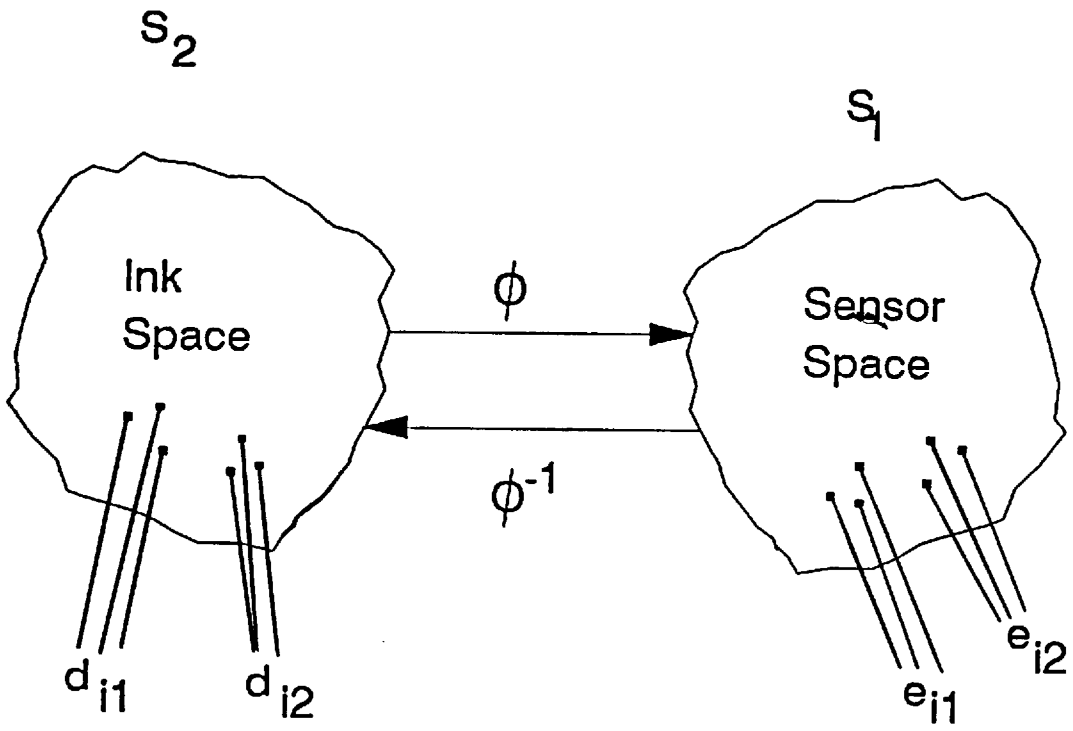
FIG. 9 is a diagrammatic view of set of elements for a sensor space and ink space.

All possible values which are output from the sensor device 21 may be used to form a vector space. For example, all possible values output from the sensor device 21 with red, green, blue and infrared channels form a four dimensional vector space R-G-B-IR, with the vector space being termed a sensor space $S_1$, with each output from the sensor device 21 being termed a vector in the sensor space $S_1$, with the minimum number of dimensions required by the sensor structure being 4. Thus, as shown in FIG. 9, a set $S_1$ of elements $e_{11}$ and $e_{12}$ being given, with the elements $e_{11}$ of the set $S_1$ being the vectors $v_{11}$ corresponding to the output from the sensor device 21 of sensing a production or current printed copy, and with the elements $e_{12}$ of the set $S_1$ being the vectors $v_{12}$ corresponding to the output from the sensor device 21 sensing a reference printed copy. In accordance with the present invention, the printed image on a production or current copy may be compared with the printed image on a reference copy in the sensor space, and if the difference between the live copy $L.C._s$ and the reference copy $R.C._s$ is within a predefined tolerance level delta, at least for all the channels in the visible region of the sensor space, such that, $[L.C._s-R.C._s]^<$ delta, the production or current copy is said to be acceptable by definition.

A set of variables may be defined to represent the amount of ink presented in a given area. For example, a set of variables C, M, Y, and K can be defined to represent or be a function of the amount of cyan, magenta, yellow, and black ink in a given area. This set of variables may correspond to the ink volume, average ink film thickness, dot size, or other quantities related to the amount of ink in a given area on the paper surface. The vector space formed by this set of variables is termed an ink space $S_2$, with the ink space $S_2$ having a dimension of 4 for a four color printing press 11. Thus, with reference to FIG. 9, a set $S_2$ of elements $d_{11}$ and $d_{12}$ are given, with the elements $d_{11}$ of the set $S_2$ being the vectors $v_{j1}$ corresponding to the variables associated with the production or current copy in the ink space $S_2$, and with the elements $d_{12}$ of the set $S_2$ being the vectors $v_{j2}$ corresponding to the variables associated with the reference copy in the ink space $s_2$.

Figure 10:
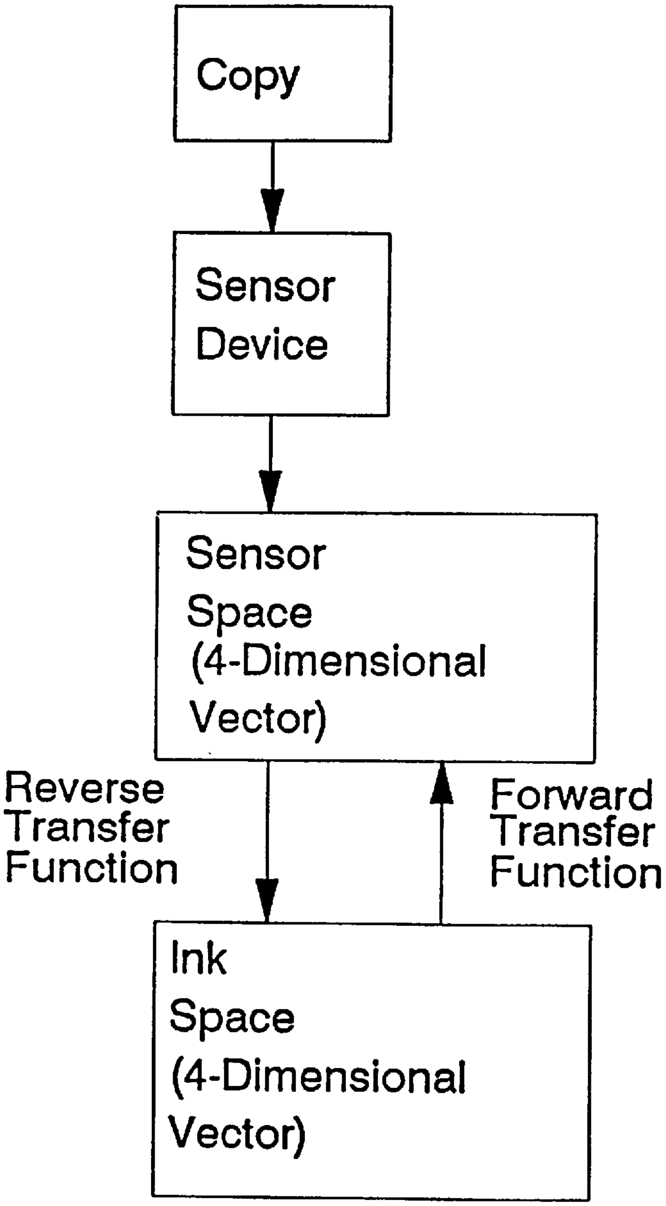
FIG. 10 is a block diagram of the sensor space and ink space in conjunction with the control system of the present invention.

With reference to FIG. 9, there exists at least one transfer function or transformation phi which can map the elements $d_{11}$ and $d_{12}$ of the set $S_2$ or the four dimensional ink space, into the elements $e_{11}$ and $e_{12}$ of the set $s_1$ or the four dimensional sensor space, with the transformation phi being termed a forward transfer function, as shown in FIGS. 9 and 10. It is noted that the subsets in each set $S_1$ and $S_2$ may overlap or may be the same.

The forward transfer function may be used in a soft proof system which can generate a proof image which can be stored in the system as a reference or can be displayed on a CRT screen.

With further reference to FIG. 9, there exists at least one transfer function or reverse transformation $phi_{-1}$ which can map the elements $e_{11}$ and $e_{12}$ of the set $S_1$ of the four dimensional sensor space into the elements of $d_{11}$ and $d_{12}$ of the set $S_2$ of the four dimensional ink space, with the transfer function being termed a reverse transfer function. Thus, both the production image and the reference image in the sensor space or set $S_1$ can be mapped into the ink space or set $S_2$ by applying the reverse transfer function $phi^{-1}$ point by point as shown in FIGS. 9 and 10.

Figure 11:
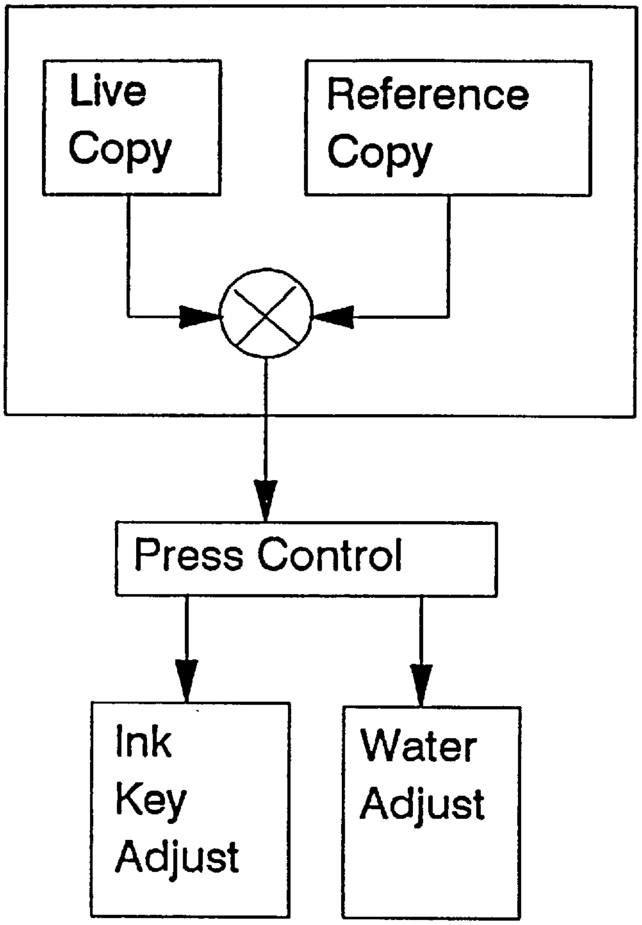
FIG. 11 is a block diagram of the control system for adjusting the printing press.

The difference between the production image and the reference image in the ink space $S^2$ thus represents the difference of the ink distribution for each of the cyan, magenta, yellow, and black inks, as shown in FIG. 11. The difference between the live and reference images in the ink space $S^2$ indicates which printing unit should be adjusted, which direction, up or down, it should be adjusted, and the amount of ink which should be adjusted. A suitable press control formula may be developed to adjust press parameters, such as ink input rate in lithographic or letterpresses, ink consistency in flexographic or gravure presses, water input rate in lithographic presses, or temperature in any of the above, based on the differences between the production and the reference image in the ink space $S_2$.

In accordance with the present invention, the press adjustments can be achieved by the automatic control system 10, by press operator alone, or by the interaction between the automatic control system 10 and the press operator. Also, the sensor device 21 may be used to monitor the printing web of the press 11 directly, i.e., on press sensing, or to monitor the prints collected from the folder of the press, i.e., off press sensing. If the digital images from the color separation processing, or the film/plate images are available, the image of the reference copy in the sensor device 21 can be generated electronically by the forward transfer function phi. The electronically generated reference may be used to set up the press 11 in order to reduce the make ready time.

The color reproduction quality can be maintained through the entire press run, through different press runs on different presses, or at different times. Thus, a closed loop automatic color reproduction control system may be formed without an additional color control target. The variation of ink, paper, and other press parameters can be compensated such that the printed copies have the highest possible overall results in matching the reference copy.

Figure 4:
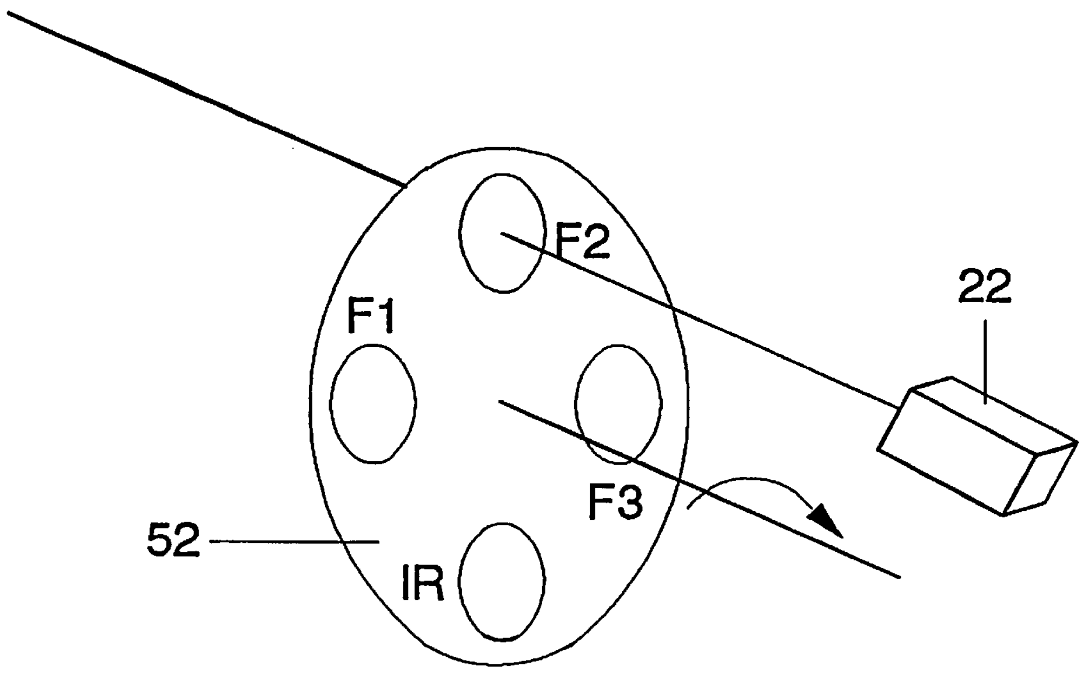
FIG. 4 is a diagrammatic view of a camera or sensor for the control system of the present invention.

As shown in FIG. 4, the camera or sensor 22 may be associated with a rotating filter member 52 having filters which only transmit the desired colors $F_1$, $F_2$, and $F_3$, such as red, green, and blue during rotation, such that the camera or sensor 22 senses and records the colors $F_1$, $F_2$, and $F_3$, sequentially or separately from the printed material which may be taken either from the current press run or from the reference press run. In addition, the filter member 52 may have an infrared (IR) filter $F_4$ in order to sense and record the energy reflected form the printed material in the infrared region. The information received by the camera or sensor 22 from the filters may be recorded in the computer or CPU for use in forming the desired data to control the inks, as previously discussed.

Figure 5:
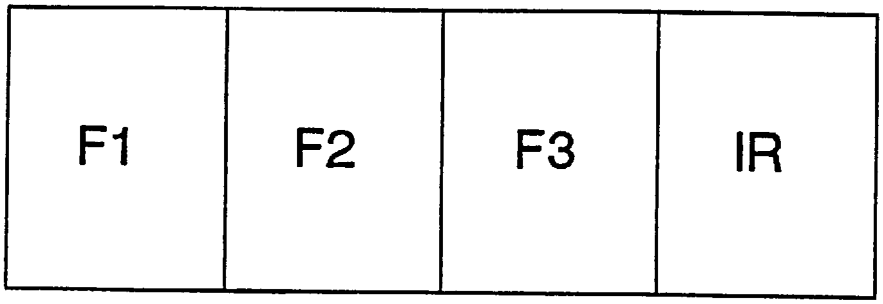
FIG. 5 is a diagrammatic view of another embodiment of the camera or sensor for the control system for the present invention.

In another form as shown in FIG. 5, the camera or sensor 22 may comprise a charge coupled device (CCD) with built in filters which converts light energy reflected from the printed material into electric energy in a video camera, i.e. $F_1$, $F_2$, $F_3$, and $F_4$, (IR), such as the distinct colors red, green, and blue in the visible region, and the near infrared energy in the infrared region, in order to supply the information to the computer 30 for storage and processing, as previously discussed.

Figure 6:
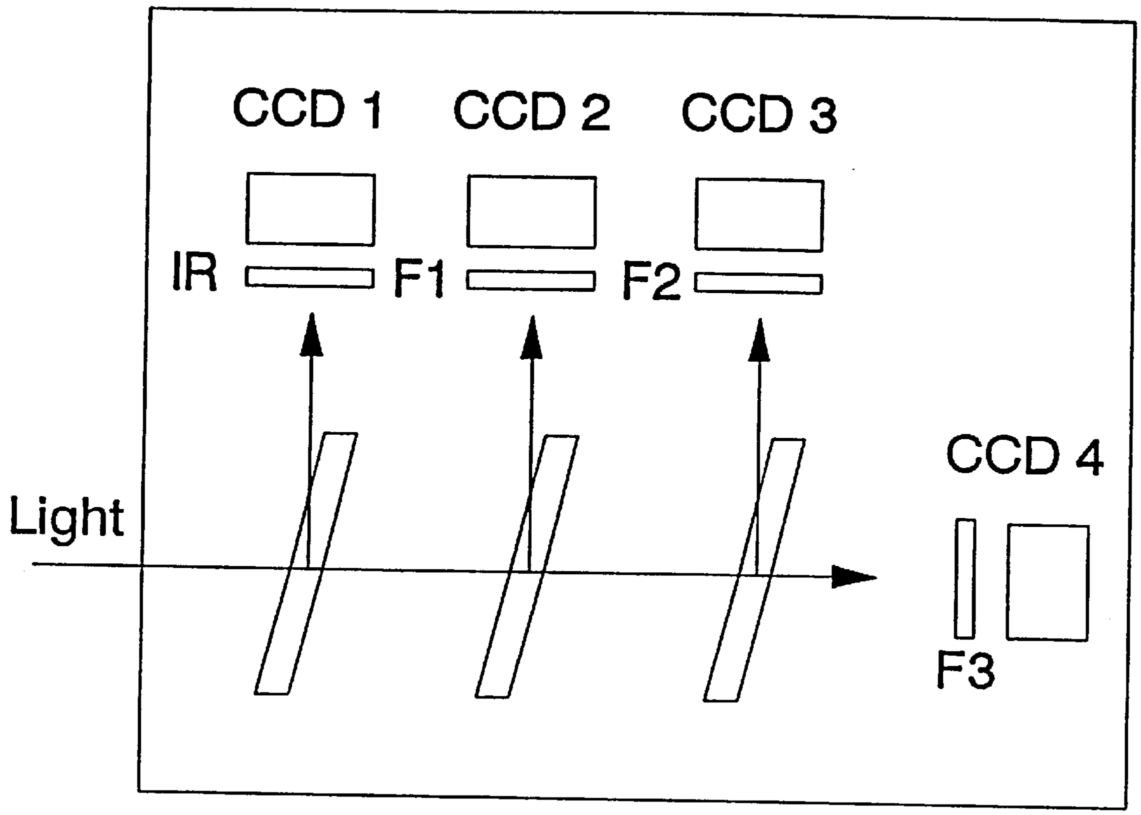
FIG. 6 is a diagrammatic view of a further embodiment of a camera or sensor for the control system of the present invention.

Another embodiment of the camera or sensor 22 of the present invention is illustrated in FIG. 6, in which like reference numerals designate like parts. In this embodiment, the camera or sensor 22 has a beam splitter in order to separate the incoming light reflected from the printed material into an infrared beam for a first CCD 1, $F_1$ such as red for a second CCD 2, $F_2$ such as green for a third CCD 3, and $F_3$ such as blue for a fourth CCD. In this embodiment, suitable prisms, lenses, or mirrors may be utilized to accomplish the beam splitting of light in order to obtain the desired color attributes in the various charge coupled devices to supply the information to the computer 30 for storage and processing in the computer 30, in a manner as previously described. Of course, any other suitable camera or sensing device may be utilized to obtain the desired colors.

Thus, a control system 10 for a printing press 11 is provided which ascertains three distinct attributes, such as colors, in the visible region of electromagnetic waves and an attribute in the infrared region of the electromagnetic spectrum for the printed inks. The control system 10 utilizes these four attributes in a four channel device to indicate and control the ink colors for use in the press 11.

Thus, the colors may be sensed from a sheet taken during a current press run, and from a sheet taken during a reference press run, after which the sensed information is utilized in order to modify ink settings of a press 11 in order to obtain repeatability of the same colors from the reference run to the current press run. In this manner, a consistent quality of colors may be maintained by the printing press 11 irrespective of the number of runs after the reference run has been made, and may be continuously used during a press run if desired.

Figure 12:
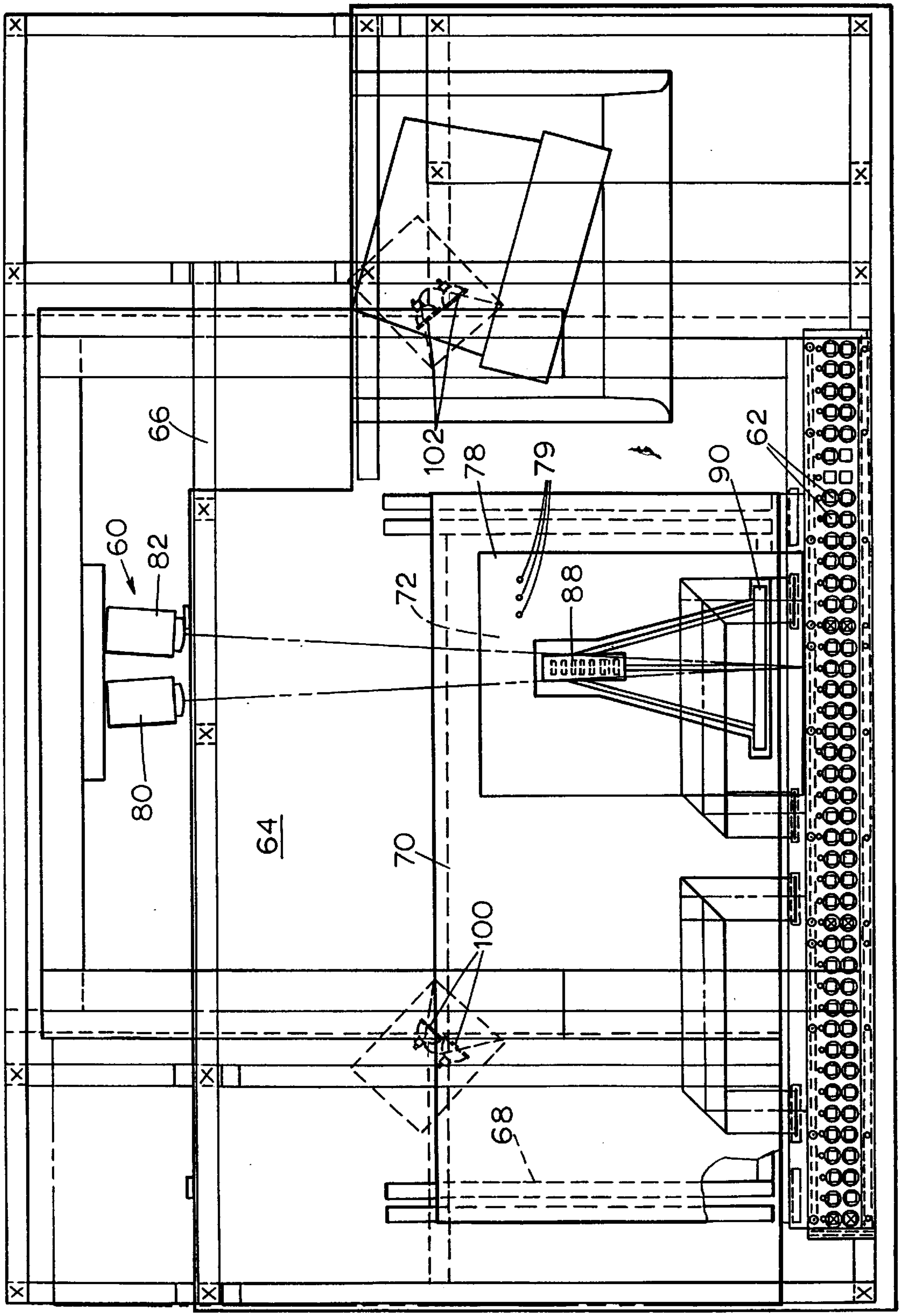
FIG. 12 is a plan view of a control system for the printing press.
Figure 13:
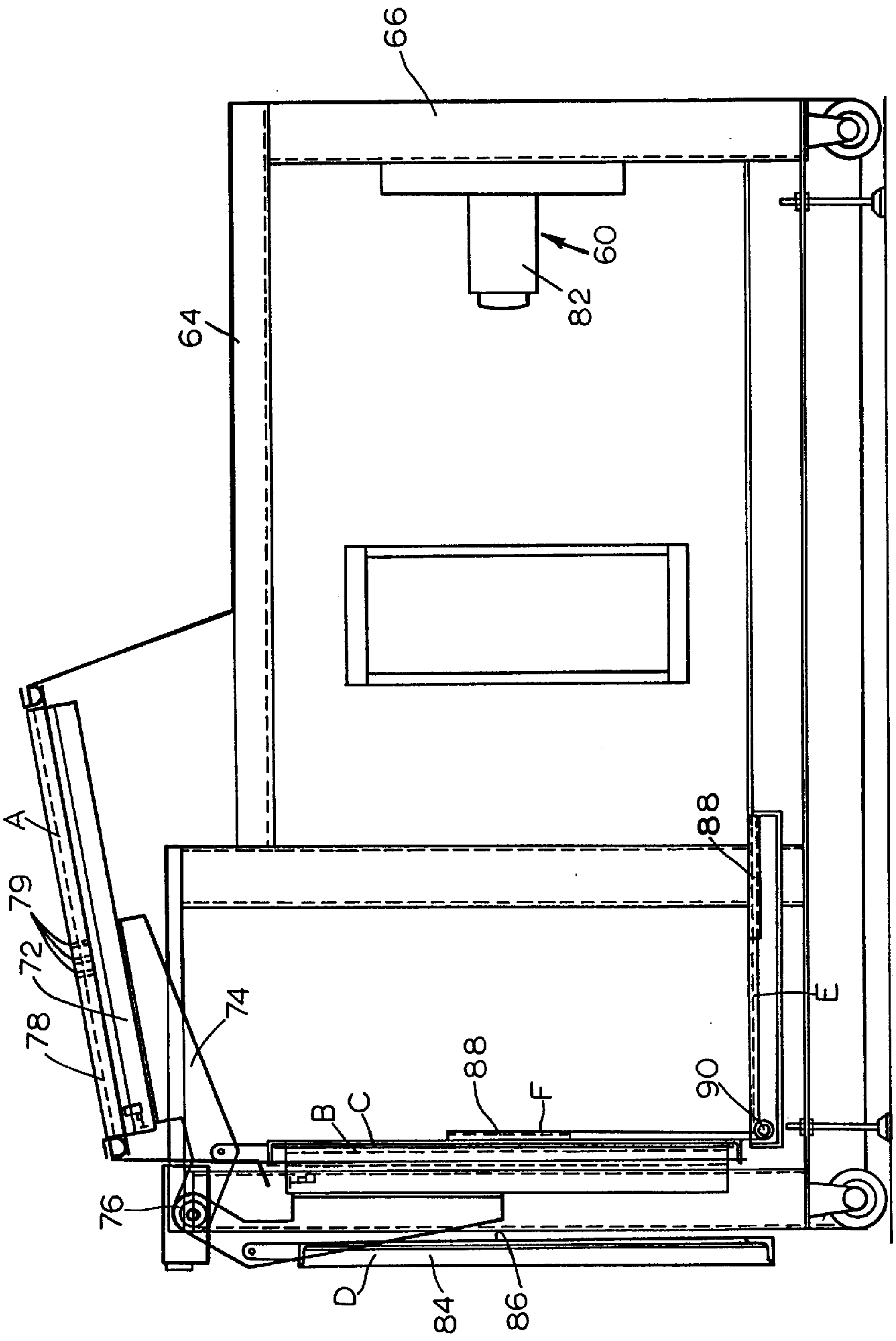
FIG. 13 is an elevational view of the control system of FIG. 12.

Referring now to FIGS. 12 and 13, there is shown a control system 60 for a printing press having a plurality of keys 62 for control of ink in the press. The control system has a table 64 supported on a frame 66.

The system 60 has a slidable frame 68 on which a plate 70 is mounted. The frame 68 and plate 70 are moveable between a first position adjacent the keys 62, and a second position spaced a substantial distance away from the keys 62. The frame 68 and the plate 70 are moved adjacent the keys 62 in order to place a printed copy on the plate 70 adjacent the keys 62 and make manual adjustments to the keys 62 based upon information on the printed copy. In the first position of the frame 68 and plate 70, the plate 70 covers an opening 72 in the table 64, while the plate 70 exposes the opening 72 when the frame 68 and plate 70 are located in the second spaced condition.

The device 60 has a pair of arms 74 pivotally mounted on a shaft 76, with a vacuum table 78 being mounted on an outer end of the arms 74. The table 78 has a plurality of small apertures 79 extending through the table 78 and communicating with a source of vacuum. The printed copy is placed on the table 78, and the vacuum releasably retains the printed copy on the table 78 for use.

A pair of cameras 80 and 82 having a field of view are mounted below the table 64 in a position to scan the printed copy, as will be discussed below. The vacuum table 78 is moved between a first upper position A with the table 78 located adjacent an upper end of the table 64 in the opening 72, and a second lower position B located beneath the table 64. In the first position A, the printed copy can be placed at a desired position on the vacuum table 78 outside the field of view of the cameras 80 and 82. When the vacuum table 78 is moved to its second position B beneath the table 64, the retained printed copy is located in the field of view of the cameras 80 and 82 in a position to scan information on the printed copy by the cameras 80 and 82.

Thus, the system 60 may use the printed copy in the manual mode using the frame 68 and plate 70, or by the vacuum table 78 in the automatic mode of reading the information on the copy and controlling the keys 62 of the press. In both cases, the manual and automatic systems utilize the same area on the upper part of the table 64 to accomplish their results for convenience of the operating personnel, and economy of space.

The system 60 has a plate 84 having a uniform surface 86 which is pivotally mounted on the arms 74. When the vacuum table 78 is located at the first position A, the plate 84 is located at an inner position C having the uniform surface 86 exposed to the cameras 80 and 82 in the field of view. In this configuration, the uniform surface 86 facing the cameras 80 and 82 is used to calibrate the system 60. The plate 84 is moved to a second outer position D outside the field of view of the cameras 80 and 82 when the vacuum table 78 is moved to its second lower position B.

The device 60 has a lower plate 88 containing a gray scale which is used to calibrate the system 60. The plate 88 is mounted on a shaft 90 which moves the plate between a first lower position E spaced from the field of view of the cameras 80 and 82, and a second upper position F in the field of view of the cameras 80 and 82. Thus, the vacuum table 78, the plate 84, and the plate 88 can all be moved into field of view of the cameras 80 and 82 when it desired to expose them to the cameras 80 and 82. The device 60 has two pairs of lamps 100 and 102 for illuminating the target.

Thus, in accordance with the present invention, a table 64 is provided for the control system of device 60 in order to scan and digitize a printed copy in an automatic mode, or may be used in a manual condition in the event that it is desired to change the keys 62 for different colors than those previously entered in the automatic mode, e.g., after the device has been preset in the automatic mode.

The foregoing detailed description has been given for clearness of understanding only, and no unnecessary limitations should be understood therefrom, as modifications will be obvious to those skilled in the art.

What is claimed is:

1. A workstation for both manually and automatically controlling the operation of a printing press, the workstation comprising:

a housing defining a cavity and an opening in communication with the cavity;

a keypad coupled to the printing press for manual adjustment of the printing press;

a door sized to cover the opening and secured to the housing for movement between a first position and a second position, the door being adapted to releasably secure a copy for viewing by a user, the door covering the opening and positioning the copy adjacent to the keypad in the first position to facilitate manual control of the printing press via the keypad, and the door exposing the opening and positioning the copy away from the keypad in the second position;

an automatic press control system at least partially disposed within the cavity defined by the housing; and, a vacuum table sized to fit within the opening beneath the door when the vacuum table is in a third position, the vacuum table being adapted to releasably secure a copy and to move from the third position within the opening to a fourth position wherein the secured copy is presented to the automatic press control system.

2. A workstation as defined in claim 1 wherein the door is slidable between the first and second positions.

3. A workstation as defined in claim 1 wherein the door substantially seals the opening in the first position when the workstation is employed for automatic control of the printing press.

4. A workstation as defined in claim 1 wherein the vacuum table is pivotable between the third and fourth positions.

5. A workstation as defined in claim 1 wherein the vacuum table is accessible when the door is in the second position and the vacuum table is in the third position.

* * * * *